US008862574B2

(12) United States Patent
Yolleck et al.

(10) Patent No.: US 8,862,574 B2
(45) Date of Patent: Oct. 14, 2014

(54) PROVIDING A SEARCH-RESULT FILTERS TOOLBAR

(75) Inventors: Stephen M. Yolleck, Sunnyvale, CA (US); Jay C. Jacobs, Danville, CA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 12/432,846

(22) Filed: Apr. 30, 2009

(65) Prior Publication Data

US 2010/0281417 A1    Nov. 4, 2010

(51) Int. Cl.
*G06F 17/30* (2006.01)
*G06F 7/00* (2006.01)

(52) U.S. Cl.
CPC .............................. *G06F 17/30873* (2013.01); *G06F 17/30867* (2013.01)
USPC .......................................... 707/722; 707/726

(58) Field of Classification Search
CPC ................... G06F 17/30864; G06F 17/30867; G06F 17/30; G06F 17/30713; G06F 17/30861; G06F 17/30873; G06F 17/30876
See application file for complete search history.

(56) References Cited

U.S. PATENT DOCUMENTS

| 6,195,679 B1 | 2/2001 | Bauersfeld et al. |
| 6,292,827 B1 * | 9/2001 | Raz ............................... 709/217 |
| 6,549,944 B1 * | 4/2003 | Weinberg et al. ............. 709/224 |
| 6,819,343 B1 | 11/2004 | Sobeski et al. |
| 7,089,237 B2 | 8/2006 | Turnbull et al. |
| 7,289,806 B2 * | 10/2007 | Morris et al. .............. 455/432.3 |
| 7,293,012 B1 * | 11/2007 | Solaro et al. ........................... 1/1 |
| 7,295,995 B1 * | 11/2007 | York et al. .................... 705/26.8 |
| 2002/0103789 A1 * | 8/2002 | Turnbull et al. .................. 707/3 |
| 2002/0147805 A1 * | 10/2002 | Leshem et al. ................ 709/223 |
| 2004/0167928 A1 | 8/2004 | Anderson et al. |
| 2004/0249677 A1 * | 12/2004 | Datta et al. ......................... 705/3 |
| 2005/0033803 A1 | 2/2005 | Vleet et al. |
| 2006/0129910 A1 | 6/2006 | Djabarov |
| 2006/0173880 A1 * | 8/2006 | Alberts et al. ................ 707/101 |
| 2006/0212350 A1 | 9/2006 | Ellis et al. |
| 2006/0282416 A1 * | 12/2006 | Gross et al. ........................ 707/3 |
| 2007/0050412 A1 * | 3/2007 | Robertson et al. ......... 707/104.1 |

(Continued)

OTHER PUBLICATIONS

E. Kirda, C. Kruegel, G. Banks, G. Vigna, and R. Kemmerer. Behavior-based Spyware Detection. In Usenix Security Symposium, 2006. pp. 273-288.*

(Continued)

*Primary Examiner* — Angelica Ruiz
(74) *Attorney, Agent, or Firm* — Dave Ream; Leonard Smith; Micky Minhas (57) ABSTRACT

Computer-readable media and methods to provide a toolbar application are described. The toolbar application receives indicators for determining when a context-specific search is executed. The toolbar application monitors uniform resource locator (URL) addresses to which a browser navigates for the inclusion of an indicator. Upon identifying an indicator in a URL the toolbar application presents filters that are associated with the indicator in a toolbar user interface. A user's selection of one or more of the filters is received at the toolbar user interface and the corresponding filters are applied to the context-specific search results by modifying the identified URL with a modifier associated with a selected filter and causing the browser or search engine to re-execute the search query with the selected filters applied. The filtered search results are presented to the user. The toolbar user interface is modified to indicate the application of the selected filters.

17 Claims, 7 Drawing Sheets

(56) References Cited

U.S. PATENT DOCUMENTS

| | | | |
|---|---|---|---|
| 2007/0067275 A1* | 3/2007 | Shekel | 707/4 |
| 2007/0107054 A1* | 5/2007 | Averbuch et al. | 726/22 |
| 2007/0143264 A1 | 6/2007 | Szeto | |
| 2007/0162422 A1* | 7/2007 | Djabarov | 707/2 |
| 2007/0203916 A1* | 8/2007 | Kwak | 707/10 |
| 2007/0233692 A1* | 10/2007 | Lisa et al. | 707/10 |
| 2008/0019614 A1* | 1/2008 | Robertson et al. | 382/305 |
| 2008/0052630 A1* | 2/2008 | Rosenbaum et al. | 715/738 |
| 2008/0091526 A1 | 4/2008 | Shoemaker | |
| 2008/0270142 A1* | 10/2008 | Srinivasan et al. | 704/270.1 |
| 2008/0306934 A1* | 12/2008 | Craswell et al. | 707/5 |
| 2009/0164408 A1* | 6/2009 | Grigorik et al. | 707/1 |
| 2009/0307762 A1* | 12/2009 | Cudd, Jr. | 726/5 |

OTHER PUBLICATIONS

Abu-Nimeh, S.; Nair, S., "Bypassing Security Toolbars and Phishing Filters via DNS Poisoning," Global Telecommunications Conference, 2008. IEEE Globecom 2008. IEEE , vol., No., Nov. 30, 2008-Dec. 4, 2008, pp. 1-6.*

Sarukkai, Ramesh, "Customizable filters for Personalized Search" World Intellectual Property Organization, Oct. 2006.*

Forum Pakistan—Pakistani Forums, Shaadi-Direct.com, http://www.forumpakistan.com/toolbarstudio-ide-t18439-html, Mar. 6, 2009, 5 pages.

* cited by examiner

PROVIDING A SEARCH-RESULT FILTERS TOOLBAR

BACKGROUND

Search engines utilize many methods and techniques for providing a user with the most valuable user experience possible. Such techniques include organizing search results in a way that provides the most relevant results near the top of a list of search results such that a user can quickly find a desired result. Another technique is to provide filters that can be selected by a user for application to a group of search results. Such filters may filter the search results by context, file types, or subject matter, just to name a few. Additional filters may also be provided to further narrow a group of filtered search results.

The provision of these filters is often done by presenting links within a search results page or in a search results listing that a user may select to have a given filter applied. These links are often disregarded or go unnoticed by users because they are located in areas typically reserved for advertisements or search results with lesser relevance. Accordingly, users may be unaware of the availability of the filters and thus, the value of the filters to both users and search engine providers is lost.

SUMMARY

Embodiments of the invention are defined by the claims below, not this Summary. A high-level overview of various aspects of the invention are provided here for that reason, to provide an overview of the disclosure, and to introduce a selection of concepts that are further described below in the Detailed Description section below. This Summary is not intended to identify key features or essential features of the claimed subject matter, nor is it intended to be used as an aid in isolation to determine the scope of the claimed subject matter.

Embodiments of the invention are directed to methods and computer-executable instructions that allow a computing device to perform methods for providing filters for filtering context-specific search results. The filters are provided to a user via a toolbar in a browser. A list of indicators is employed by the computing device to identify when a context-specific search is initiated by a user. The indicators have filters associated with them that allow a user to filter results from the context-specific search. The computing device monitors uniform resource locator (URL) addresses to which the user navigates via the browser and identifies URLs containing an indicator. Filters associated with a URL indicator are presented to the user in association with a toolbar in the browser. A user may select one or more of the presented filters to filter or refine the search results. The filtered search results are then presented to the user.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention describe computer-readable media and methods for providing a filters toolbar in association with a browser. A toolbar application provides a filters toolbar to present a set of filters for filtering context-specific search results. In one embodiment, computer-readable media having computer-executable instructions embodied thereon that, when executed, cause a computing device to perform a method for providing a toolbar displayed in a browser that includes filters for filtering context-specific search results is described. An indicator that indicates a context-specific search is received. The indicator is associated with filters. A computing device monitors uniform resource locator (URL) addresses to which a browser navigates. A URL that contains an indicator is identified. The computing device presents in association with a toolbar on a computer display, a filter associated with the indicator.

In another embodiment, a computer-implemented method at a first computing device for providing a toolbar in a browser displayed on a computer display associated with the first computing device, the toolbar including filters for filtering context-specific search results is described. An indicator that indicates a context-specific search is received at the first computing device. The indicator is associated with filters. A URL address to which a browser navigates is monitored via the first computing device. A URL that contains the indicator is identified. The first computing device presents the filters associated with the indicator at a toolbar in a browser on a computer display. A selection of a filter is received at the first computing device. A filter selected from the presented filters is applied to the search results from the context-specific search. Filtered context-specific search results are presented on the computer display via the first computing device. The filtered context-specific search results result from applying the selected filter to the search results from the context-specific search.

In another embodiment, computer-readable media having computer-executable instructions embodied thereon that, when executed, cause a computing device to perform method for providing a toolbar in a browser displayed on a computer display that includes filters for filtering context-specific search results is described. An indicator is received at a computing device that indicates a context-specific search. The indicator is associated with filters. The filters are associated with a representative image and a modifier. The modifiers include words, phrases, symbols, and codes to be used to modify a Uniform Resource Locator to apply a respective filter. A URL address to which a browser navigates is monitored via the computing device. A URL that contains the indicators is identified. A filter is presented in association with a toolbar on a computer display. The filter is associated with the indicator and is represented on the toolbar by the associated representative image. A selection of the filter is received. The filter is applied to search results from the context-specific search. Filtered context-specific search results are presented on the computer display via the computing device. The filtered context-specific search results result from application of the filter to the search results from the context-specific search. The appearance of toolbar is modified to indicate the application of the filter to the search results from the context-specific search.

Figure 1:
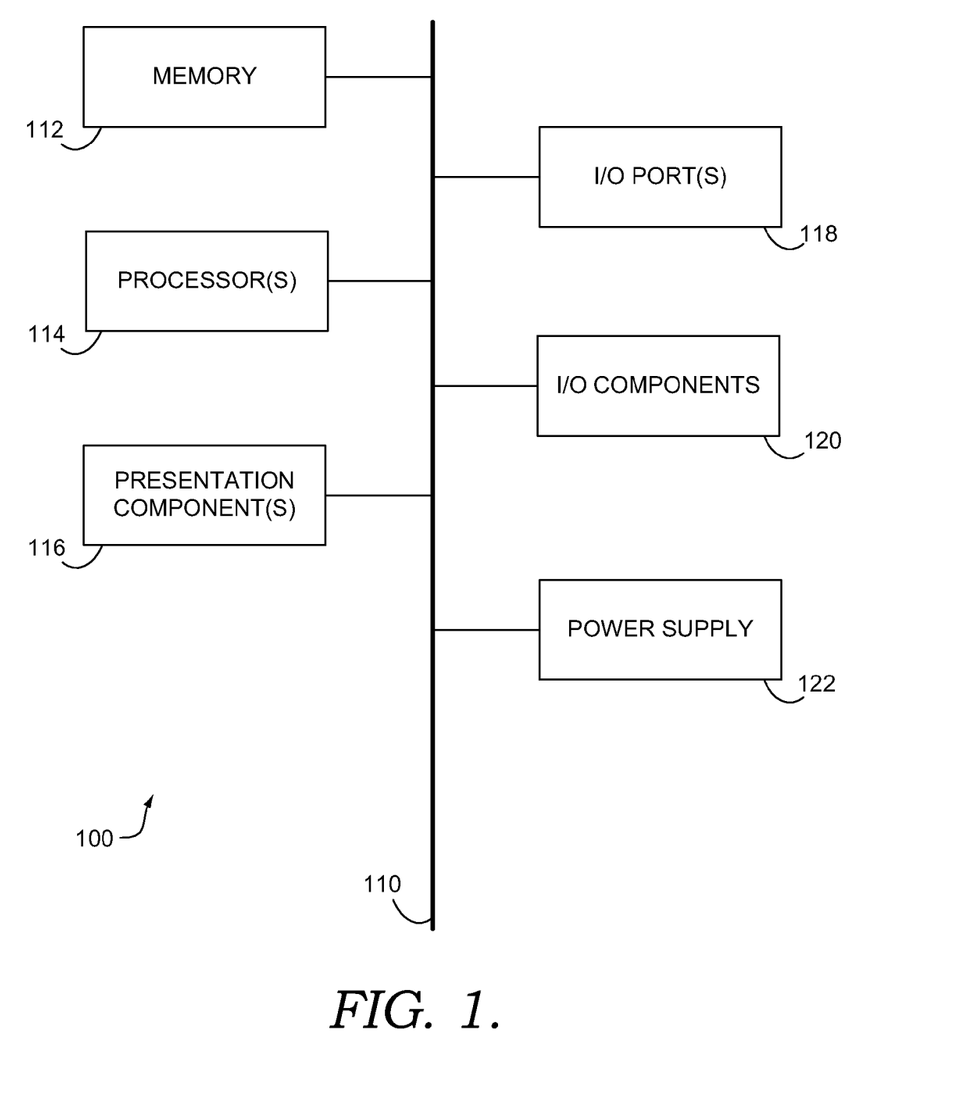
FIG. 1 is a block diagram depicting an exemplary operating environment suitable for use in implementing embodiments of the invention.

Referring now to the drawings in general and initially to FIG. 1 in particular, a computing device 100 is described in accordance with embodiments of the invention. The computing device 100 is but one example of a suitable computing environment and is not intended to suggest any limitation as to the scope of use or functionality of invention embodiments. Neither should the computing device 100 be interpreted as having any dependency or requirement relating to any one or combination of components illustrated.

Embodiments of the invention may be described in the context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, input/output (I/O) components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; compact disc read-only memory (CD-ROM), digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

The memory 112 includes computer-storage media in the form of volatile and/or nonvolatile memory. The memory 112 may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Embodiments of the invention employ a browser application (hereinafter "browser"). The browser is any available browser application capable of navigating to, interacting with, and displaying webpages on the Internet, World Wide Web, a private network, or other network such as, for example and not limitation, Internet Explorer® from Microsoft® Corporation of Redmond, Wash. or Mozilla FireFox® from Mozilla® Corporation of Mountain View, Calif.

Figure 2:
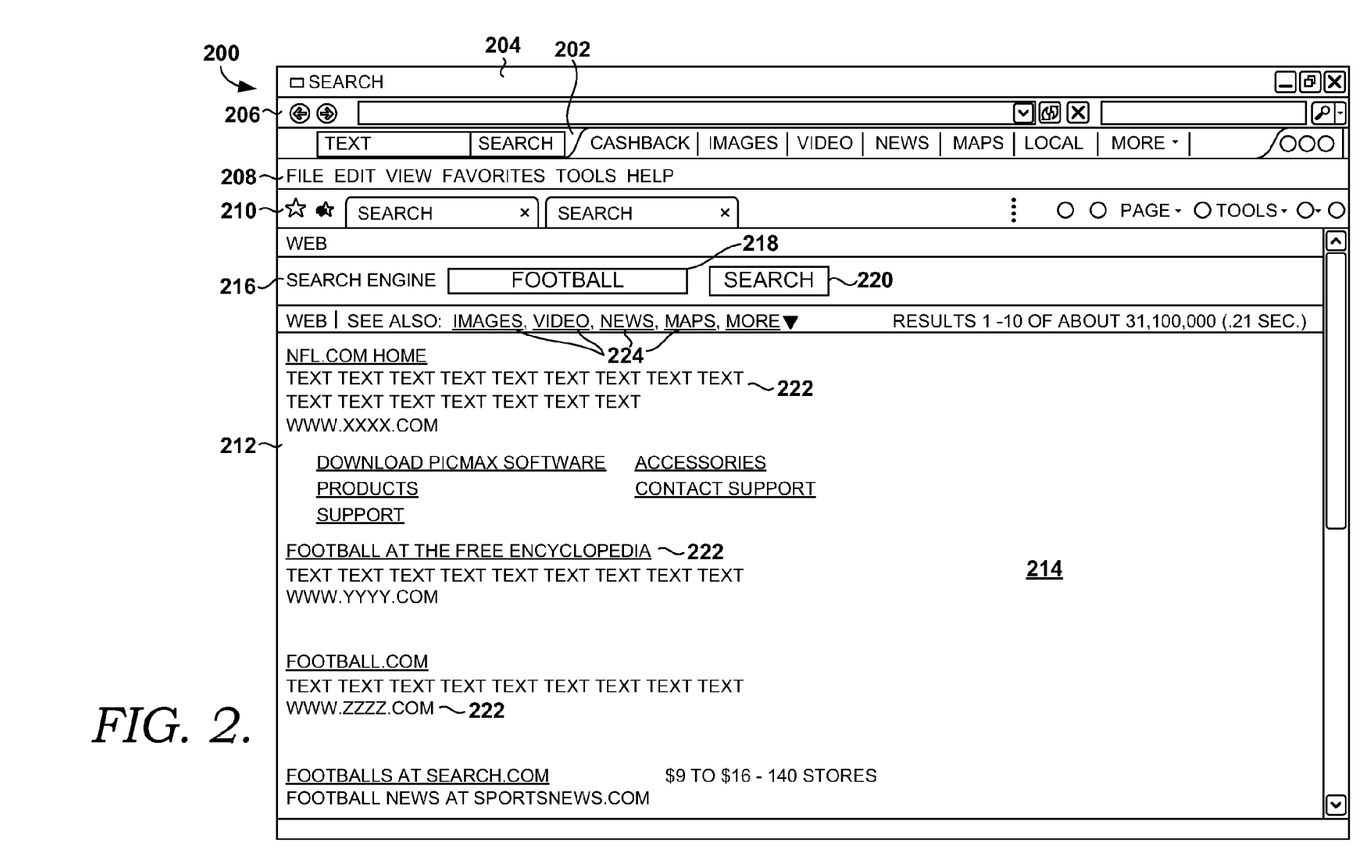
FIG. 2 is a schematic illustration depicting a browser wherein a search results webpage and a toolbar is displayed, in accordance with embodiments of the invention.

Turning now to FIG. 2, a schematic illustration depicting a browser wherein a search results webpage and a browser toolbar are displayed, in accordance with embodiments of the invention is shown. As depicted in FIG. 2, a browser user interface or browser window 200 includes one or more browser toolbars 202 that supply a user interface for providing a user access to one or more functions of a browser toolbar application or browser components. The browser toolbar application may be an integrated component of the browser or may be a plug-in or add-on application. Generally, the browser toolbar 202 is displayed near the top of a browser window 200 along with other components of the browser window such as a title bar 204, a navigation bar 206, a menu bar 208, a tab bar 210, and a viewing window 212 in which various web pages to which the browser navigates are displayed.

As is most applicable to embodiments of the invention, FIG. 2 depicts a search results web page 214 displayed in the viewing window 212. The search results web page 214 may be generated by any available search engine and typically includes a title portion 216, a search term entry field 218, a selectable search activation button 220, one or more advertisements (not shown), and one or more search results listings 222. The search results web page 214 also includes one or more links 224 to context-specific search options.

A context-specific search narrows the search results returned by a search engine based on a context selected by a user. Contexts include for example, and not limitation, images, videos, news, and products. Where for example, a context-specific search based on the context of images returns only images, a context-specific search based on videos returns only video or audio-video files, a context-specific search based on news returns only news articles, news-related web pages and the like, and a context-specific search based on products returns only offers for sales of products, product sales web pages, deals on products for sales, and the like.

Contexts might also include any other category, subject matter, search result type, search result format, or search result characteristic by which search results returned by a search engine in response to a search query may be narrowed or filtered, such as for example and not limitation, health, spaces, cashback, maps, local, and web. For example, a context-specific search based on health might only return related health articles, healthcare providers, healthcare products, and the like, a context-specific search based on spaces returns personal web pages or spaces of other users, a context-specific search based on cashback returns incentivized offers for sale of items, a context-specific search based on maps returns maps, directions, aerial images, and the like for a searched location, and a context-specific search based on local returns only local listings of businesses, people, and the like near a user's physical location. Additionally, a context-specific search based on web (or a non-context specific web search) returns general search results listings as are known in the art along with one or more filters that are indicated by the search terms of the search query (described more fully below).

For example, where a user wishes to find images of a baseball player he or she might search for the player by entering the player's name into a search engine. In response the search engine returns search results for the query that include links to web pages, images, videos, audio recordings, and advertisements, and the like. The user may then narrow or filter the search results by selecting the context-specific link 224 for a context-specific search for images. In response, the search engine may run the query again or filter the previous search results such that only search results comprising images are provided in a context-specific search results web page (as shown and described with respect to FIG. 4, below) presented to the user in viewing window 212.

In an embodiment, the invention may be implemented as a plug-in or add-on (hereinafter "plug-in") to an existing application. The existing application may include, by way of example and not limitation, a browser application or a toolbar application. In such embodiments, the plug-in may be installed into memory on a computing device such that it is integrated into the functionalities of the existing application.

Figure 3:
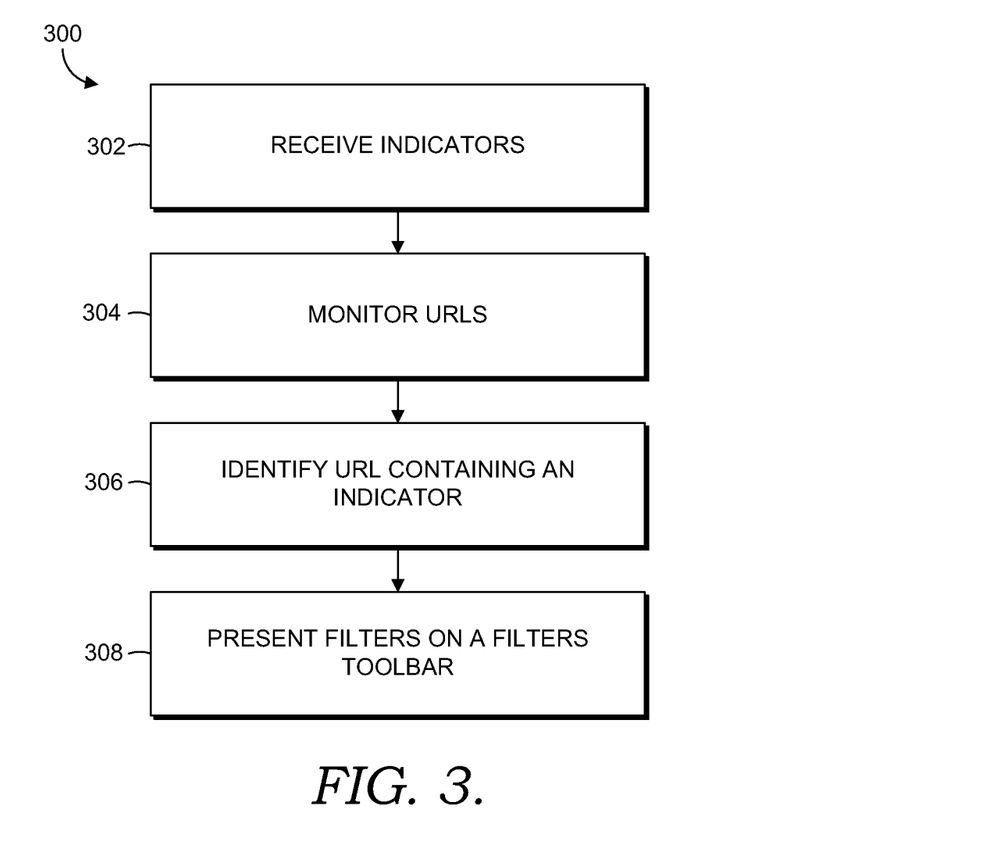
FIG. 3 is a flow diagram depicting a method for providing filters for filtering context-specific search results, in accordance with embodiments of the invention.

With reference now to FIG. 3 a flow diagram depicting a method 300 for providing filters for filtering context-specific search results is described, in accordance with embodiments of the invention. Initially, one or more indicators is received by a context-specific search filters toolbar application (hereinafter "toolbar application") at a computing device, as indicated at 302. The toolbar application provides a toolbar user interface (hereinafter "filters toolbar") that is presented to a user in a browser window. The toolbar application operates in conjunction with a browser as described above. Prior to initial presentation of search results, the filters toolbar is not displayed in the browser window, but rather a browser toolbar, such as the browser toolbar 202 is displayed, as depicted in FIG. 2. In an embodiment the toolbar application is displayed in the browser window.

The indicators include keywords or patterns of words, symbols, phrases, codes, or syntax that are contained in uniform resource locator (URL) addresses of context-specific search result web pages. The indicators are useable by the toolbar application to identify web pages that are context-specific search result web pages. In an embodiment, the one or more indicators are provided as a list of indicators and other associated data described below. In another embodiment, the list is received from a provider or publisher of the toolbar application via a network connection therewith. In another embodiment, the list of indicators is a configuration file and may be written in an extensible markup language (XML). Additionally, the list of indicators may be updated via a network connection with a publisher or provider of the toolbar application or via one or more portable computer-readable media. Such updates may add, remove, or change any of the data contained in the list as is necessary to provide the toolbar application with a current list of indicators and related data. The updating process is automatically controlled by another application charged with responsibility to check for and retrieve updates for applications, or updates can be retrieved by a user or other application.

The list of indicators includes for each indicator at least one filter, a representative image for each filter, and one or more modifiers for applying the filter. The filters each provide a way of filtering, narrowing, categorizing, or otherwise sorting context-specific search results. The filters are context specific in that the filters are useful in filtering the types of search results returned by a particular context-specific search. For example, filters for a context-specific search for images are applicable to filtering images based on properties or characteristics of images, but may not necessarily be useful for application with a context-specific search for news articles. As such, the filters are only associated with indicators of context-specific search results for which the filters are applicable. In an embodiment, one or more of the filters is useable and applicable to more than one specific context.

Representative images are provided for each filter to serve as visual representations of the filters that can be displayed in the filters toolbar to represent the filter to a user. The images can be any available image, icon, drawing, or graphic suitable to represent the filter or characteristics of the filter to a user. In an embodiment, an address or memory location is provided in the list of indicators from which the images may be retrieved.

The modifiers include one or more words, phrases, symbols, codes, or syntax that are appended to, integrated into, or that modify a URL for the context-specific search results web page in order to apply a selected filter. In an embodiment, the modifiers indicate a memory location from which to retrieve the filter.

In embodiments, the list of indicators may also include a text string for each filter. The text string comprises a title, phrase, or statements describing a corresponding filter. If desired, text string may be displayed as a "tool tip" to provide the user with information about the filter. The user may access the tool tip for viewing by various methods such as hovering a mouse cursor over a filter image on the filters toolbar or by providing a right-click selection of the filter image on the filters toolbar, among other methods. In an embodiment, an address or memory location is provided from which the text string may be retrieved.

With continued reference to FIG. 3 the toolbar application monitors URLs to which the browser navigates via the computing device, as indicated at 304. Such monitoring is done passively in that the toolbar application does not affect or interfere with operations or functions of the browser in a manner apparent to a user. Each time the browser navigates to a new URL the toolbar application checks the URL with its corresponding list of indicators and determines if an indicator is present in the URL.

At 306, the toolbar application identifies a URL as containing an indicator from the list. The toolbar application then determines filters, images, modifiers, and/or text strings that are associated with the identified indicator from the list. The filters are presented to a user by the toolbar application on a filters toolbar, as indicated at 308. A filters toolbar is depicted in FIG. 4 at reference numeral 402, and is more fully described below.

Figure 4:
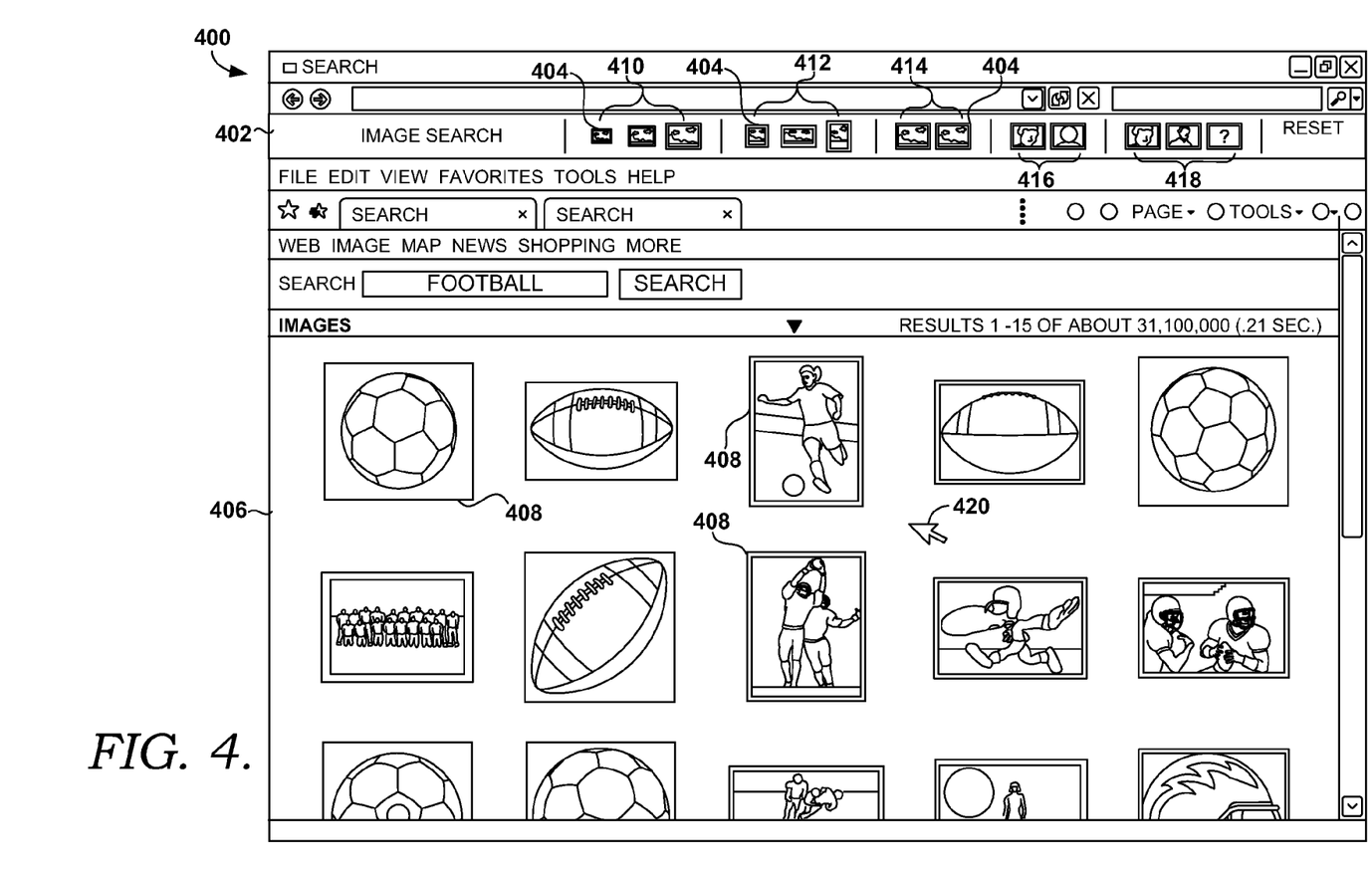
FIG. 4 is a schematic illustration depicting a browser wherein a context-specific search results webpage and a filters toolbar are displayed, in accordance with embodiments of the invention.

With reference to FIG. 4, a browser window 400 includes a filters toolbar 402 displaying images 404 corresponding to filters associated with an identified indicator. To present the filters as indicated at 308, the filters toolbar 402 is generated by the toolbar application to replace the browser toolbar 202 of FIG. 2. The filters toolbar 402 may be animated and may provide one or more sound effects to draw a user's attention to the presentation of the filters. The filters toolbar 402 remains visible to the user until the user navigates away from the context-specific search results web page at which point the filters toolbar 402 is again replaced by the browser toolbar 202. Again, the replacement of the filters toolbar 402 with the browser toolbar 202 may be animated and may provide one or more sound effects. Alternatively, in another embodiment, the filters toolbar 402 is generated and displayed in addition to any other browser toolbars displayed in the browser window 400. In yet another embodiment, the filters toolbar 402 is always visible in the browser window 400 and is updated to reflect available filters for a given webpage displayed in a viewing window 406.

FIG. 4 also depicts a plurality of context-specific search results 408 displayed in the viewing window 406. As depicted in FIG. 4 a context-specific search has been completed to search based on the context of images. As such, only images are displayed for the context-specific search results 408. The displayed images of the context-specific search results include images of various characteristics including for example and not limitation, file sizes, dimensions, aspect ratios, orientations, subject matters, photographs, and drawings, among others.

As described above, the filters toolbar 402 displays representative images 404 of filters that are applicable to further filter, narrow, or sort the context-specific search results images 408 based on one or more characteristics. The filters presented in the filters toolbar 402 are based on any available characteristic of context-specific search results that might allow a user to meaningfully narrow a group of context-specific search results 408. For example, the filters of the filters toolbar 402 include filters based on size of the image 410, image aspect ratio or orientation 412 (e.g., portrait, landscape, or other), color 414 (e.g., black and white, color, sepia, etc.), style 416 (e.g., photograph, illustration), and face 418 (e.g., including a face, a head and shoulders, or other).

Figure 5:
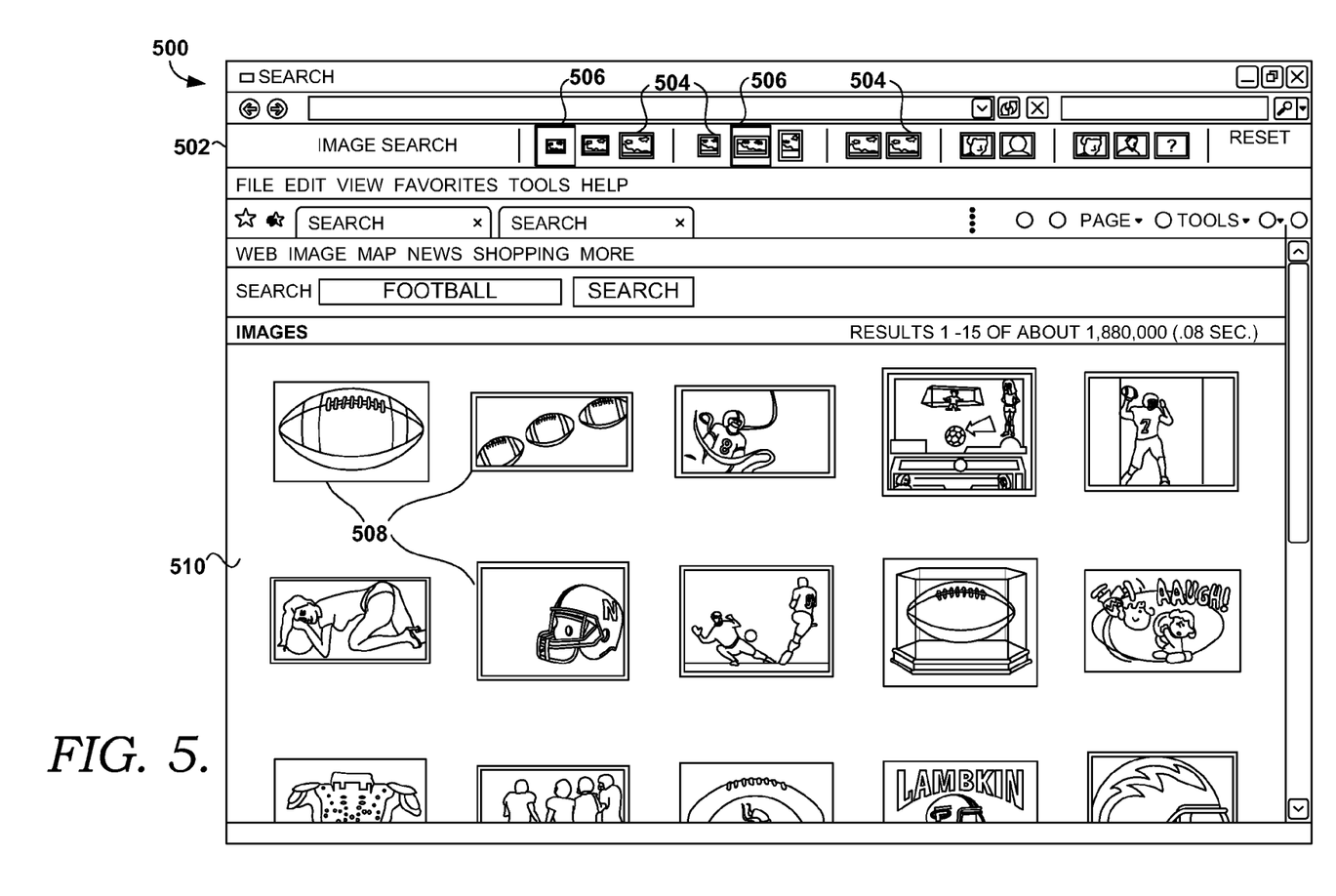
FIG. 5 is a schematic illustration depicting a browser wherein a context-specific search results web page with filtered search results and a filters toolbar depicting activated filters are displayed, in accordance with embodiments of the invention.

A user may select a desired filter 410-418 from the filters toolbar 402 by providing an input such as a click from a mouse cursor 420, among other methods. In an embodiment, the user selects multiple filters 410-418 from the filters toolbar 402. The toolbar application identifies the appropriate modifiers from the indicators list for the selected filters and integrates them into the URL for the context-specific search results web page. The browser is directed to the modified URL thereby applying the filter to the context-specific search results and displaying filtered context-specific search results 508 as depicted in FIG. 5. In an embodiment, directing the browser to the modified URL causes the search engine to re-execute the search query in order to apply the filter.

FIG. 5 depicts a browser window 500, a modified filters toolbar 502, depicting representative images 504 corresponding to filters associated with the identified indicator, and modified images 506 corresponding to filters that have been selected and applied to produce filtered context-specific search results 508 (hereinafter "filtered results"). The modified filters toolbar 502 is modified by employing the modified images 506 to indicate filters that have been applied to the context-specific search results 408. The representative images provided for the filters in the list of indicators are modified to provide the appearance that they are buttons that have been depressed into the modified filters toolbar 502. A variety of other methods for modifying the images 504 such as changing the color of the image, animating, highlighting, or placing an indicator on or near the image, among other methods are useable in embodiments of the invention. All such methods are understood as disclosed herein.

As depicted in FIG. 5, filters based on size and aspect ratio have been applied to the context-specific search results 408 as indicated by the modified filters toolbar 502 and the modified images 506 thereon. The selected filters produce the filtered results 508 displayed in the viewing window 510. The filtered results 508 include only those images from the context-specific search results 408 that meet the requirements of the selected filters. As such, only those context-specific search results 408 that are small in size and have a wide aspect ratio are displayed as filtered results 508 in the viewing window 510. In an embodiment, the filtered results 508 are grouped near the top of a list of context-specific search results and the remaining context-specific search results are displayed below the filtered results 508.

Figure 6:
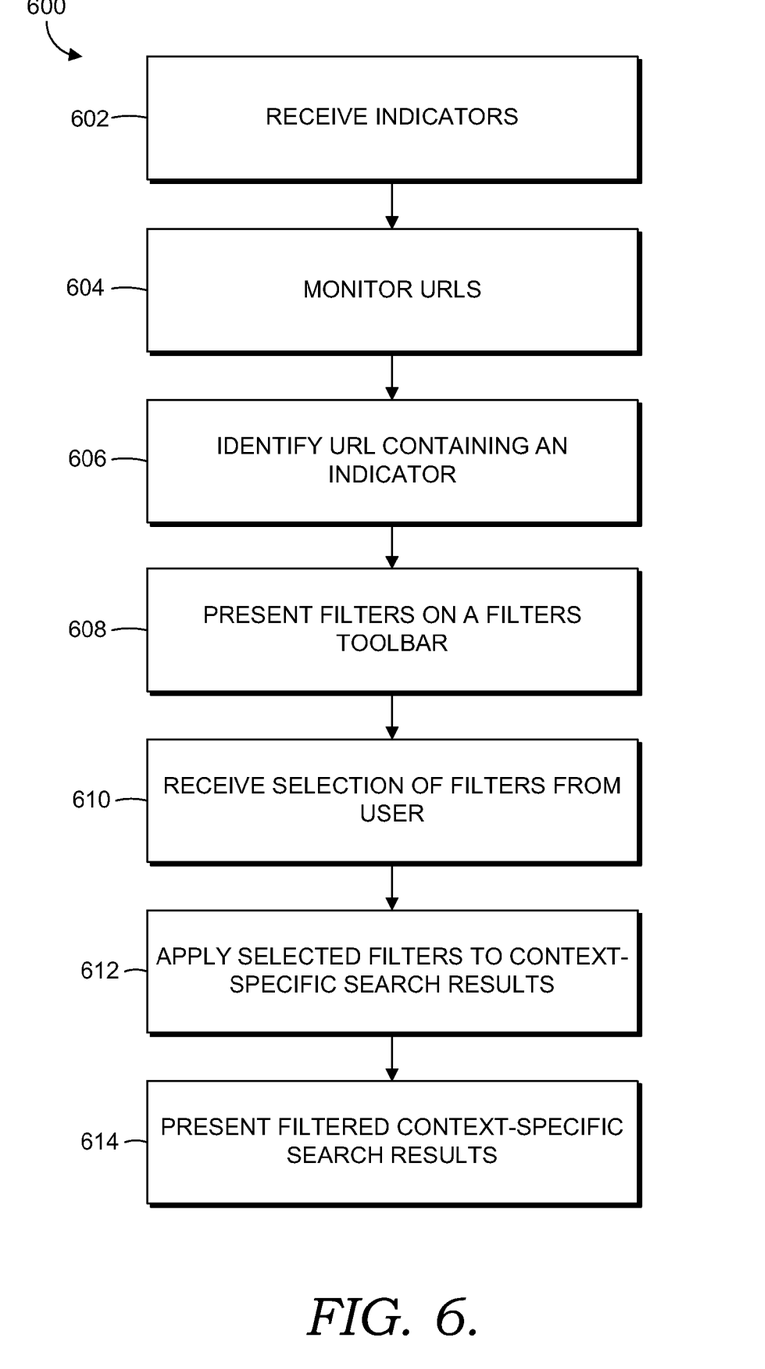
FIG. 6 is a flow diagram depicting a method for providing filters for filtering context-specific search results, in accordance with embodiments of the invention.

Referring now to FIG. 6, a flow diagram depicting a method 600 for providing filters for filtering context-specific search results is described in accordance with embodiments of the invention. At 602 a list of indicators is received by a toolbar application at a computing device. The list of indicators includes filters that are associated with each of the indicators and modifiers that are associated with each of the filters. The computing device monitors URLs to which a user navigates via a browser, as indicated at 604. A URL containing an indicator from the list of indicators is identified by the toolbar application, as indicated at 606. The toolbar application presents a set of filters associated with the identified indicator to a user on a filters toolbar, as indicated at 608. The filters are presented via representative images included in the list of indicators. In an embodiment, the list of indicators includes an address or location at which the images are stored on the computing device and the toolbar application retrieves the images based on the address or location.

The set of filters are presented to the user along with one or more context-specific search results that are displayed by a browser. At 610, a selection of one or more of the filters presented to the user in the filters toolbar is received. The selection is provided by the user via a click of a mouse, a keyboard shortcut, or by any other available means. Upon receiving the selection, the toolbar application accesses the list of indicators to determine one or more modifiers that are necessary to apply the one or more filters. The modifiers associated with each of the selected filters are appended to the URL of the context-specific search results web page and the browser is directed to the URL address by the toolbar application to apply the filters to the context-specific search results, as indicated at 612. Alternatively, in another embodiment, the toolbar application identifies another application, program, macro, or other functionality to filter the context-specific search results. The filtered context-specific search results are then presented to the user by the browser, as indicated at 614.

Figure 7:
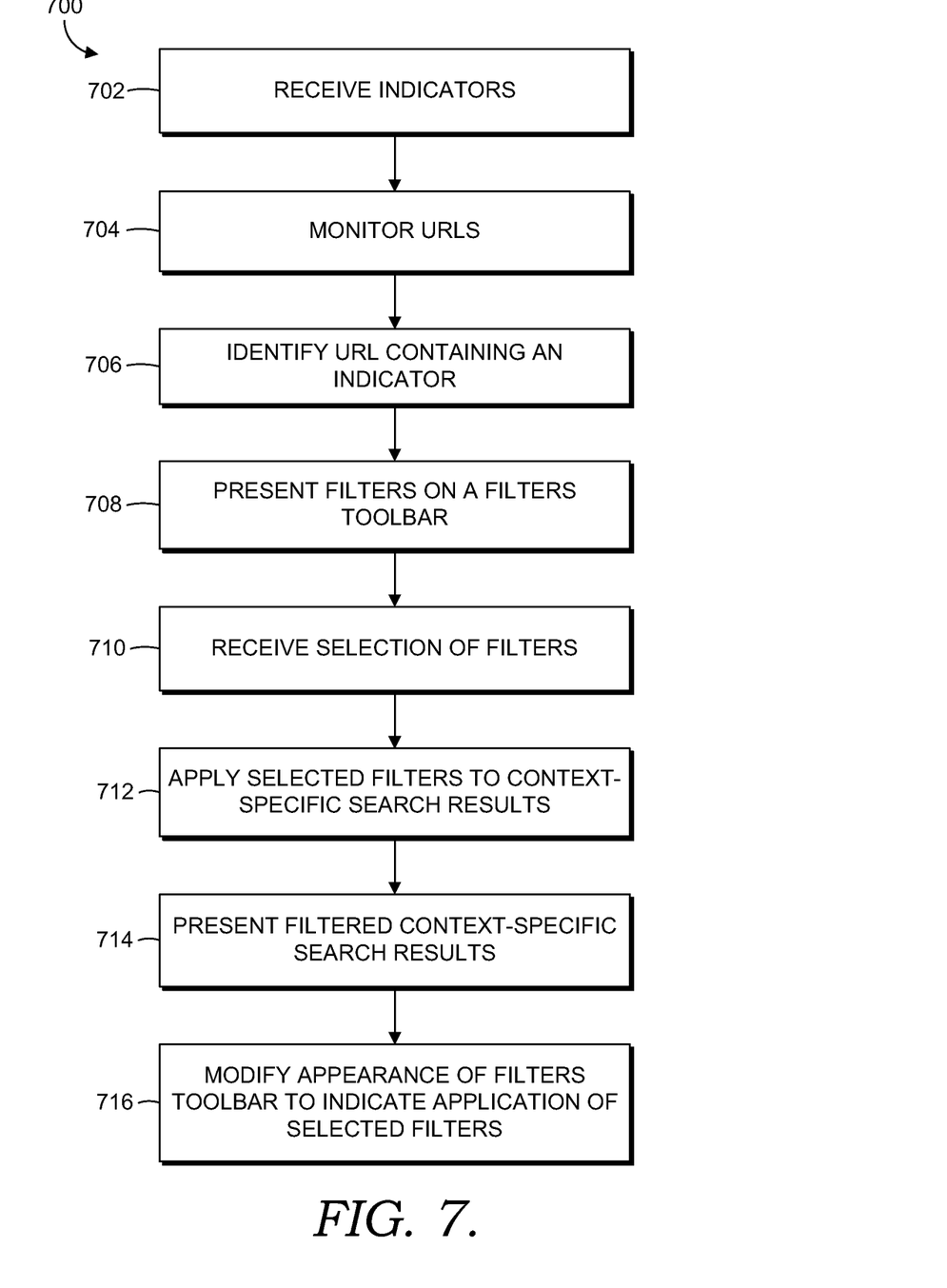
FIG. 7 is a flow diagram depicting a method for providing filters for filtering context-specific search results, in accordance with embodiments of the invention.

With reference now to FIG. 7, a flow diagram depicting a method 700 for providing filters for filtering context-specific search results is described in accordance with embodiments of the invention. Initially, a list of indicators is received by a toolbar application from a publisher, or provider of the toolbar application, as indicated at 702. The toolbar application monitors the URLs to which a browser is navigated by a user, as indicated at 704. The user engages a search engine and executes a search query. The search engine returns one or more search results that are displayed in a viewing window of a browser such as depicted in FIG. 2. The search engine also provides links to allow a user to initiate a context-specific search for the user's search query.

Upon selecting one of the available links, one or more additional fields or address components are appended to the URL of the search query by the search engine. The additional fields and address components direct the browser and/or search engine to execute the search query again as a context-specific search. The toolbar application determines that a context-specific search is executed by identifying one or more of the additional fields or address components of the URL as comprising an indicator that is included in the list of indicators, as indicated at 706.

At 708, the toolbar application determines filters that are associated with the identified indicator and presents the filters to the user on a filters toolbar. The filters toolbar is animated to provide the impression that the filters toolbar pops out or scrolls out of the browser window in order to draw the user's attention to the filters toolbar.

The filters toolbar also displays tool tips to a user to provide information about each of the presented filters. The user access the tool tips by providing an input to the toolbar application via the filters toolbar, such as for example and not limitation hovering a mouse cursor over the filters toolbar or by providing a right click from a mouse at one of the filter images in the filters toolbar. In response the toolbar application presents via the filters toolbar, a short text window to display the tool tip. The presented text is provided to the toolbar application in the list of indicators wherein each filter has an associated text string. Alternatively, the list of indicators might provide a file location from which the text string for the tool tip may be retrieved. The tool tip provides the user with a short explanation of the type of filter that is represented by a given image on the filters toolbar among other information that may be conveyed.

At 710, the user determines that they wish to have one or more of the filters presented on the filters toolbar applied to the context-specific search results and the user's selection of the desired filters is received by the toolbar application at the filters toolbar.

To apply the one or more filters, the toolbar application determines modifiers for each of the one or more selected filters from the list of indicators. The modifiers are added, appended, or otherwise integrated into the URL of the context-specific search results web page to modify the URL and to direct the browser and/or search engine to re-execute the search query and apply the filters to the search results, as indicated at 712.

Filtered context-specific search results are presented, as indicated at 714. The toolbar application modifies the filters toolbar to indicate to the user which filters have been applied to the context-specific search results, as indicated at 716. The user may then select a search result as is known in the art or may provide further inputs to the toolbar application to remove a filter or to apply additional filters. The filters toolbar remains visible on the browser until the browser is navigated away from the context-specific search results webpage at which point the filters toolbar is replaced by another browser filters toolbar or is merely removed from view. The replacement of the filters toolbar is animated similarly to the animation provided for presenting the filters toolbar and provides an audio file that is played to a user.

In another embodiment, the toolbar application also presents one or more related links via an icon in the filters toolbar through which a user can access the related links. The toolbar application identifies related links based on one or more of the search query terms supplied to the search engine by the user and an identified context-specific search. The related links may be provided in the list of indicators, or the toolbar application or the search engine may execute an additional search as a background process to obtain a listing of related searches from another networked computing device.

In another embodiment, the toolbar application provides dynamically generated filters based on a list of indicators and one or more search query terms. Such filters are determined based on one or more of the context of the search and the subject matter of the search query, among others. The list of indicators received by the toolbar application includes indicators that indicate search query terms for which dynamically generated filters can be generated. For example, a user may provide a search query comprising "Chief's Football." The toolbar application identifies in a manner similar to that described above that one or more filters are available based on the search term "football" and presents those filters in the filters toolbar. Such filters might include for example and not limitation, teams, players, tickets, and memorabilia, among others. In another embodiment, the indicators indicate a web search via a search engine that is not based on the context of the search. In such an embodiment, one or more of the search query terms may be identified as an indicator that indicates one or more filters are available.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method for providing a toolbar displayed in a browser that includes filters for filtering context-specific search results, the method comprising:
   receiving one or more indicators that are associated with one or more filters that are useable to filter one or more context-specific search results obtained by the search engine;
   monitoring, via a computing device, a uniform resource locator (URL) address to which a browser navigates;
   identifying at least one indicator of the one or more received indicators that is contained within the monitored URL;
   determining that one or more filters are associated with the identified at least one indicator, and
   presenting, responsive to identifying the at least one indicator, at least one associated filter of the one or more associated filters, the at least one associated filter being presented in association with a toolbar on a computer display.

2. The method of claim 1, wherein the method further comprises:

receiving one or more of a representative image for the one or more associated filters, and one or more modifiers for incorporation into the monitored URL to apply a respective filter of the one or more associated filters.

3. The method of claim 2, wherein die method further comprises:
receiving a tool tip corresponding to one or more filters, wherein the tool tip is presented to a user to provide information about the associated filter.

4. The method of claim 1, wherein the method further comprises:
receiving a change to the at least one indicator; and
updating the at least one indicator to reflect the received change.

5. The method of claim 1, wherein the at least one identified indicator contained in the monitored URL indicates a context-specific search that includes a search for one of images, videos, news, products, health, spaces, cashback, maps, local, and web.

6. The method of claim 1,
wherein the at least one identified indicator contained in the monitored URL indicates a context-specific search,
wherein the context-specific search includes a search for which one or more dynamic filters are available, and
wherein the one or more dynamic filters allow a user to narrow a plurality of search results resulting from the context-specific search based on one or more categories of the plurality of search results.

7. The method of claim 1, wherein the toolbar comprises one of a plug-in or add-on to an existing browser application.

8. The method of claim 1, wherein the at least one indicator includes one or more of a keyword or a pattern including one or more words, symbols, phrases, codes, and syntax.

9. The method of claim 1, wherein the at least one indicator indicates one or more related searches, and wherein a link is presented to a user for each of the one or more related searches at the toolbar.

10. A computer-implemented method for providing a toolbar in a browser that includes filters for filtering context-specific search results, wherein the browser is displayed on a computer display, the method comprising:
receiving an indicator at a computing device that is associated with one or more filters that are useable to filter one or more context-specific search results obtained by the search engine, the one or more filters being associated with a representative image and a modifier, the modifier including one or more words, phrases, symbols, and codes that are useable to modify the URL to apply a respective filter;
monitoring via the computing device, a URL address to which a browser application navigates;
identifying that the received indicator is contained in the URL address to which the browser application navigates;
determining that one or more filters are associated with the identified at least one indicator;
presenting in a toolbar in a user interface of the browser application on a computer display, at least one associated fitter of the one or more associated filters, the at least one associated filter being represented on the toolbar by the associated representative image;
receiving a selection of the at least one associated filter;
applying the at least one associated filter to one or more search results from the context-specific search;
presenting on the computer display via the computing device, one or more filtered context-specific search results, the one or more filtered context-specific search results resulting from application of the at least one filter to the one or more search results from the context-specific search; and
modifying an appearance of the toolbar to indicate the application of the at least one filter to the one or more search results from the context-specific search.

11. The method of claim 10, wherein the method further comprises:
receiving a tool tip corresponding to the at least one associated filter, wherein the tool tip is presented to a user to provide information about the at least one associated filter.

12. The method of claim 10, wherein the method further comprises:
receiving a change to the received indicator; and
updating the received indicator to reflect the received change.

13. The method of claim 10, wherein the received indicator contained in the monitored URL indicates a context-specific search that includes a search for one of images, videos, news, products, health, spaces, cashback, maps, local, and web.

14. The method of clam 10,
wherein the received indicator contained in the monitored URL indicates a context-specific search,
wherein the context-specific search includes a search for which one or more dynamic filters are available, and
wherein the one or more dynamic filters allow a user to narrow a plurality of search results resulting from the context-specific search based on one or more categories of the one or more search results.

15. The method of claim 10, wherein the toolbar comprises one of a plug-in or add-on to an existing browser application.

16. The method of claim 10, wherein the received indicator includes one or more of a keyword or a pattern including one or more words, symbols, phrases, codes, and syntax.

17. The method of claim 10, wherein the received indicator indicates one or more related searches, and wherein a link is presented to a user for each of the one or more related searches at the toolbar.

* * * * *